Patented Oct. 25, 1938

2,134,006

UNITED STATES PATENT OFFICE 2,134,006

ADHESIVE

Harry C. Roller, Glendale, Calif.

No Drawing. Application August 27, 1935,
Serial No. 38,104

2 Claims. (Cl. 134—23.3)

An object of the present invention is the production of an adhesive having improved adhesive qualities.

A further object is to accurately control the time during which the adhesive remains tacky in order to allow proper penetration of the different kinds of surfaces to be joined by the adhesive prior to the setting thereof, or in other words to provide an adhesive, certain ingredients of which may be varied in order that the adhesive will set more quickly when joining together surfaces which are non-porous and vice versa.

Another object is the provision of an adhesive having properties of joining together a greater variety of different substances of variant characteristics, and which is possessed of fire-resisting qualities.

Additional objects will be found throughout the specification.

One manner of making my improved adhesive when joining wood or glass is as follows:

100 parts of alkyd resin dissolved in any of the usual commercial solvents, for example pinene derivatives.
5 parts of any of the following:
    Alkyd resin derivative
      or beta naphthol
      or di-butyl phthalate
      or tri-cresyl phosphate
      or abietic acid derivatives or combinations of same
      or tri-phenyl phosphate
3 parts of oxidized rape seed or China-wood oil
2 parts cyclohexane or cyclohexane acetate
2 parts crude caoutchouc, dissolved in benzene, or petroleum solvent.

Add gradually in order named; the whole combined by agitation in a sealed vessel.

Another manner of making my improved adhesive when joining metals or a metal and another kind of material, is as follows:

100 parts of alkyd resin dissolved in any of the usual commercial solvents.
3 parts of any of the following:
    Alkyd resin derivative
      or beta naphthol
      or di-butyl phthalate
      or tri-cresyl phosphate
      or tri-phenyl phosphate
      or abietic acid derivatives or combinations of same
1 part of crude caoutchouc, dissolved in benzene, or petroleum solvent.

Add gradually in order named; the whole combined by agitation in a sealed vessel.

For metals, a priming coat of basic lead chromate and/or lead oxide or carbonate with a vegetable oil, or a nitro-cellulose solution containing these oxidants may first be applied.

Burgundy pitch or resin gums, such as colophony, may be included.

Although the above formulae have been found to produce an adhesive having especially good adhesive qualities, I propose to vary the above formulae within the following limits.

100 parts of alkyd resin dissolved in any of the usual commercial solvents, for example pinene derivatives
3–8 parts of any of the following:
    Alkyd resin derivative
      or beta naphthol
      or di-butyl phthalate
      or tri-cresyl phosphate
      or abietic acid derivatives or combinations of same
      or tri-phenyl phosphate
    Oxidized rape seed or China-wood oil
1–2 parts cyclohexane or cyclohexane acetate
1–2 parts crude caoutchouc, dissolved in benzene or petroleum solvent.

The substances which have non-oxidating qualities are any one of the following:

Alkyd resin derivative
Beta naphthol
Di-butyl phthalate
Tri-cresyl phosphate
Abietic acid derivatives
Tri-phenyl phosphate The purpose of the non-oxidants is to control the time during which the preparation remains tacky and by so doing the time that the adhesive composition completely sets or hardens may be controlled, to thereby enable the substance to entirely permeate the interstices or pores in the materials being joined together, whereby a more permanent and efficient connection is established. On the other hand, if the non-oxidant was omitted, experience has shown that adhesives of this type have a tendency to harden or set prematurely, or before the interstices, the pores or irregularities between the adjacent surfaces to be joined have been completely and entirely permeated by the adhesive elements of the composition.

It will of course be obvious that inasmuch as the non-oxidant has the controlling effect upon the time that the adhesive sets, a variation in the relative amounts of the non-oxidant to the other ingredients is permissible in order that the time between which the adhesive is applied to the surfaces of the substances to be joined and the time when the adhesive sets or solidifies may be varied in accordance with variations in the characteristics of the surfaces to be joined. This will be apparent when the fact is recognized that some substances have a greater amount of porosity than others, and some substances are so variant as to their surface characteristics as to require substantial differences in time in the setting of the adhesive. These differences in time of setting may be, as previously suggested, controlled by the amount of the non-oxidant that is added to the adhesive.

I additionally contemplate the use of Burgundy pitch or resin gums such as colophony. This substance is added in the event is it desired to produce a more tacky adhesive.

Alkyd resins are used since they are manufactured products and are, therefore, uniform in composition, whereas the natural resins would not be. In addition to this, however, these resins are obtainable at low prices.

Phthalates, phenyl phosphates, beta-naphthol, oxidized oil, etc. are means of controlling brittleness or friability as distinguished from flexibility or elasticity. An example of this use would be the tempering of resins or similar substances with resin oil.

Cyclohexanes are used to assist in the formation of true solutions, rather than mixtures where the components are merely swollen to a very high degree. The fact that true solutions are used adds greatly to the adhesive properties of the mixture and increases the number of surfaces to which the adhesive will stick and adds to the useful life of the composition.

Caoutchoucs are flexing components and are used to impart and control flexibility and increase the elasticity of the adhesive.

The combination of these items does not depend upon oxidation, heat, evaporation or the use of external means in order to complete the reaction, although heat may in some instances hasten it. The combination produces adhesive properties which are broader in application and adhere more firmly to a greater variety of surfaces than they would if applied alone. The particular adhesive properties developed by the combination of ingredients makes it possible to cement to materials now requiring special preparation for each, such as block tin, aluminum, vulcanized rubber, glass, Celluloid, lead, etc., and the adhesive can be used without a change in formula or composition upon practically any surface.

By suitable variations in the proportions, the consistency of the adhesive may be controlled so that it may be applied by brush, spray, air pressure, dipping or by any other means ordinarily used.

Various materials may be applied to the adhesive after it has been applied upon a surface. These materials may be applied in solid or comminuted form by pneumatic, hydraulic or other pressure means. They may also be applied by gravity or any other suitable means, although I prefer to use a spray gun provided with an extra large nozzle for this purpose.

While I have herein disclosed with considerable particularity certain preferred manners of performing my invention I do not thereby desire or intend to limit myself solely thereto, for as hereto stated, the procedure may be modified, the precise proportions of the materials utilized may be varied and other materials having equivalent properties may be employed as desired without departing from the spirit and scope of the invention as defined in the appended claims.

I claim:

1. An adhesive consisting of 100 parts of an alkyd resin in solution in an organic solvent, 3 to 8 parts of tri-cresyl phosphate, 3 to 8 parts of an oxidized rape seed oil, 1 to 2 parts of crude caoutchouc in solution, and 1 to 2 parts of cyclohexane.

2. An adhesive consisting of 100 parts of an alkyd resin in solution in an organic solvent, 3 to 8 parts of a plasticizer of the class comprising beta naphthol, dibutyl phosphate, tri-cresyl phosphate and tri-phenyl phosphate, 3 to 8 parts of an oxidized drying or semi-drying oil, 1 to 2 parts of a crude caoutchouc in solution and 1 to 2 parts of cyclohexane.

HARRY C. ROLLER.